Fig. 1

INVENTORS
Edward J. Frey
Thomas E. Davidson
BY
R R Candor
Their Attorney

Fig. 4

WATER HEATING
TIMER DIAL SETTING (1)

—— WATER HEATING PERIOD (TIMER STOPPED)
------ ENDING OF WATER HEATING

INVENTORS
Edward J. Frey
Thomas E. Davidson
Their Attorney

—— HEAT & TUMBLING CONTINUED (DRY)
++++ HEATER DE-ENERGIZED (COOLING)

CONTINUED DRY (54-57)

Fig. 12

INVENTORS
Edward J. Frey
Thomas E. Davidson
BY
Their Attorney

Fig. 13

INVENTORS
Edward J. Frey
Thomas E. Davidson
BY
Their Attorney

March 15, 1960  E. J. FREY ET AL  2,928,267
LAUNDRY CONTROL SYSTEM
Filed Nov. 23, 1955  11 Sheets-Sheet 11

INVENTORS.
Edward J. Frey.
Thomas E. Davidson.
BY
Their Attorney.

United States Patent Office 2,928,267
Patented Mar. 15, 1960

2,928,267
LAUNDRY CONTROL SYSTEM

Edward J. Frey and Thomas E. Davidson, Dayton, Ohio, assignors to General Motors Corporation, Detroit, Mich., a corporation of Delaware Application November 23, 1955, Serial No. 548,644

7 Claims. (Cl. 68—12)

This invention relates to a domestic appliance and more particularly to automatic washer-dryers and combinations thereof and to their control systems.

To make automatic washer-dryers and combinations thereof adaptable to the maximum use and to all conditions and all localities it is desirable that the controls be automatic yet very flexible and selective and should include all the practical optional features.

It is an object of this invention to provide a simple practical control system for automatic washers, centrifuges, dryers and combinations thereof providing a selection of the temperature and amount of liquid fill, the time of washing and agitation, the number of rinses, selective automatic water heating with or without agitation, and with or without temperature control, spray rinses, optional thermostatic controlled drying with different temperature limits together with the ability to stop and start manually at various points of the complete cycle and to stop automatically at various portions of that cycle.

These and other objects are obtained in the form of the invention shown in which a timer motor drives a cam shaft which in conjunction with a water level switch and an automatic water temperature control provides filling of the tub with hot or tepid water while agitation is provided by a drive motor under the control of a separate cam operated switch. The water temperature control also includes an arrangement for water heating during which time the timer and drive motors are idle. The untimed water heating period is terminated by a thermostat which resumes operation of the timer motor and the drive motor. However, heating may be continued during the succeeding agitation period.

The timer motor through its cams also provides successive agitating, draining, spray rinse and spin periods successively for both the selective wash and the first rinse periods. A second rinse is provided by filling, agitating, draining and spinning after which the system may be stopped automatically or it may continue automatically into the drying cycle. The timer motor is stopped during the principal portion of the drying period in which heaters drive moisture out of the clothes. This moisture is condensed by water contact condensation. A dryer temperature selector control is provided in which either a low or high heating rate may be obtained together with either a low temperature or a high temperature thermostat for terminating the untimed heating period. The actuation of either of these thermostats restarts the timer motor to provide a period of continued reduced heating and condensing followed by a complete termination of the heating with air circulation and water condensation continued for another limited period.

Further objects and advantages of the present invention will be apparent from the following description, reference being had to the accompanying drawings, wherein a preferred form of the present invention is clearly shown.

This control system is applicable to various types of washing machines, centrifuges, dryers and combinations thereof. For example, it may be used in connection with an automatic washer 624 of the type disclosed in the Chamberlain et al. Re. Patent 22,375, reissued September 14, 1943, which may be provided with a water contact condensation drying system 66 such as is shown for example in the Pugh Patent 2,451,692, issued October 19, 1948, or the Hammell et al. Patent 2,644,245, issued July 7, 1953.

Figure 1:
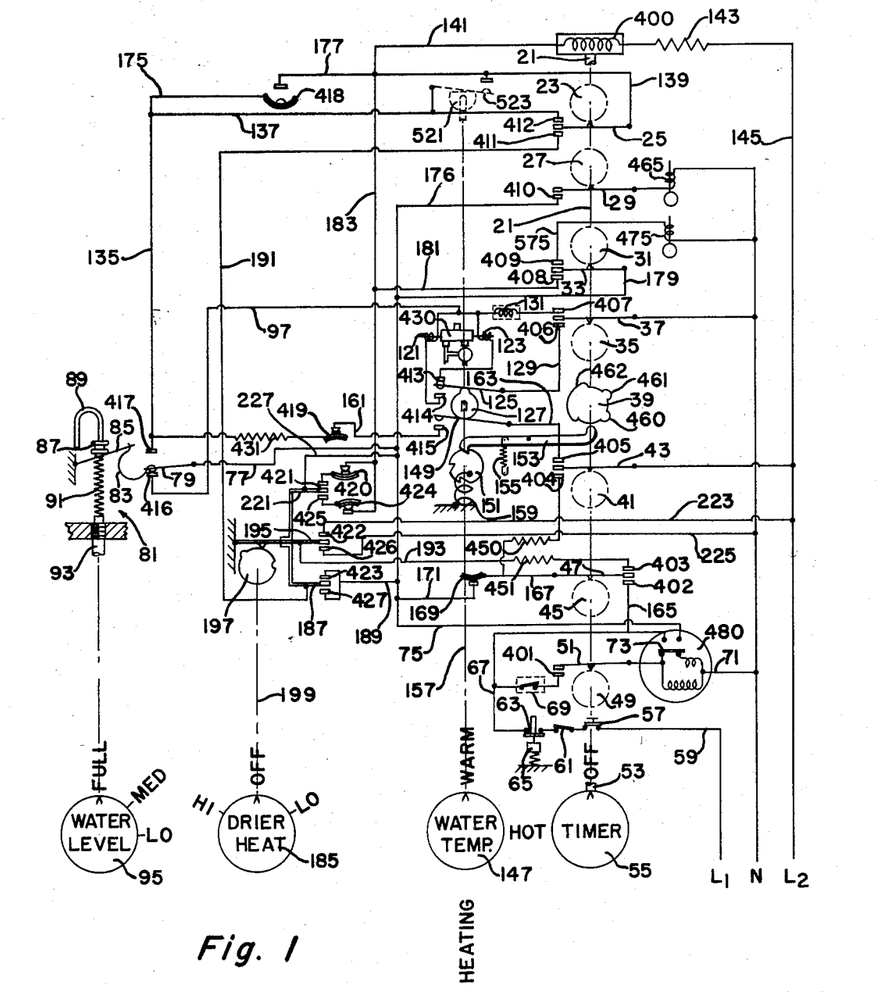
Figure 1 is a diagrammatic view and wiring diagram disclosing one embodiment of our invention with the parts and dials shown in positions normal for the off condition.
Figure 12:
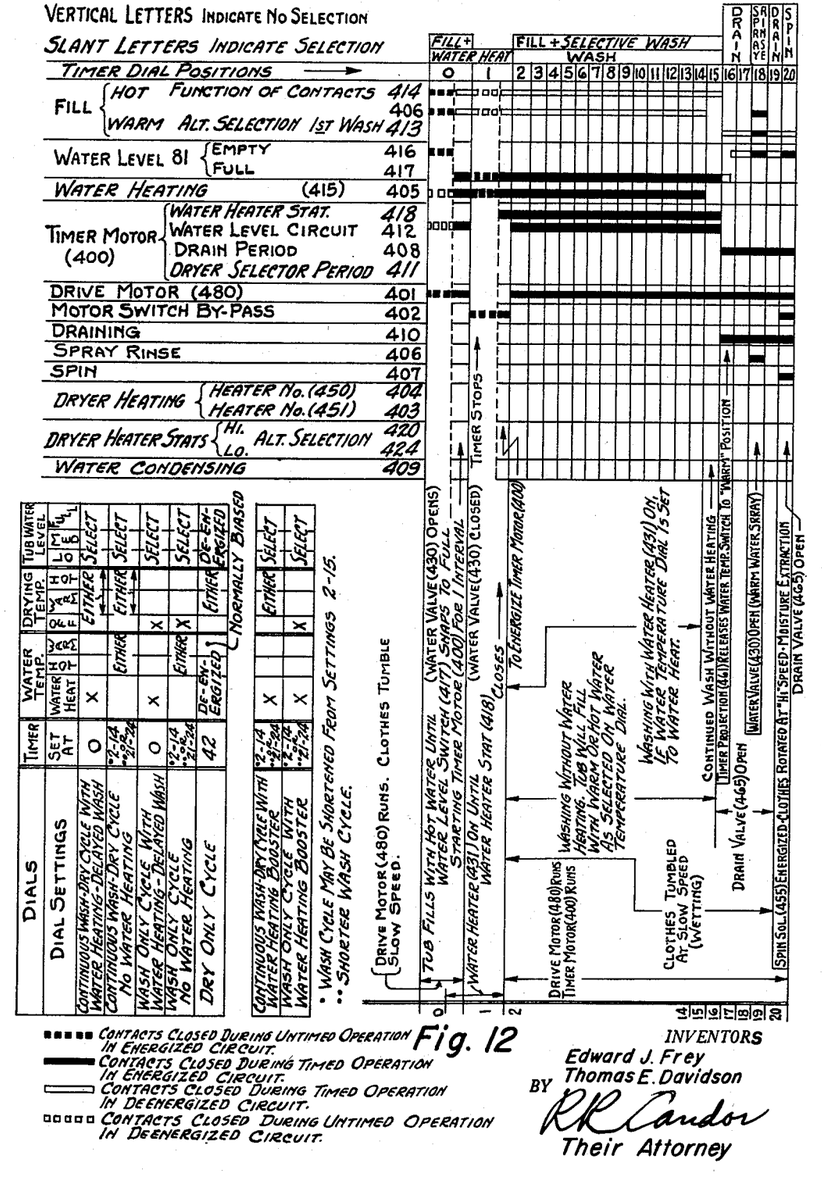
Figure 12 is a chart with suitable keys showing the parts and operation related to positions 0 through 20 of the timer knob.
Figure 13:
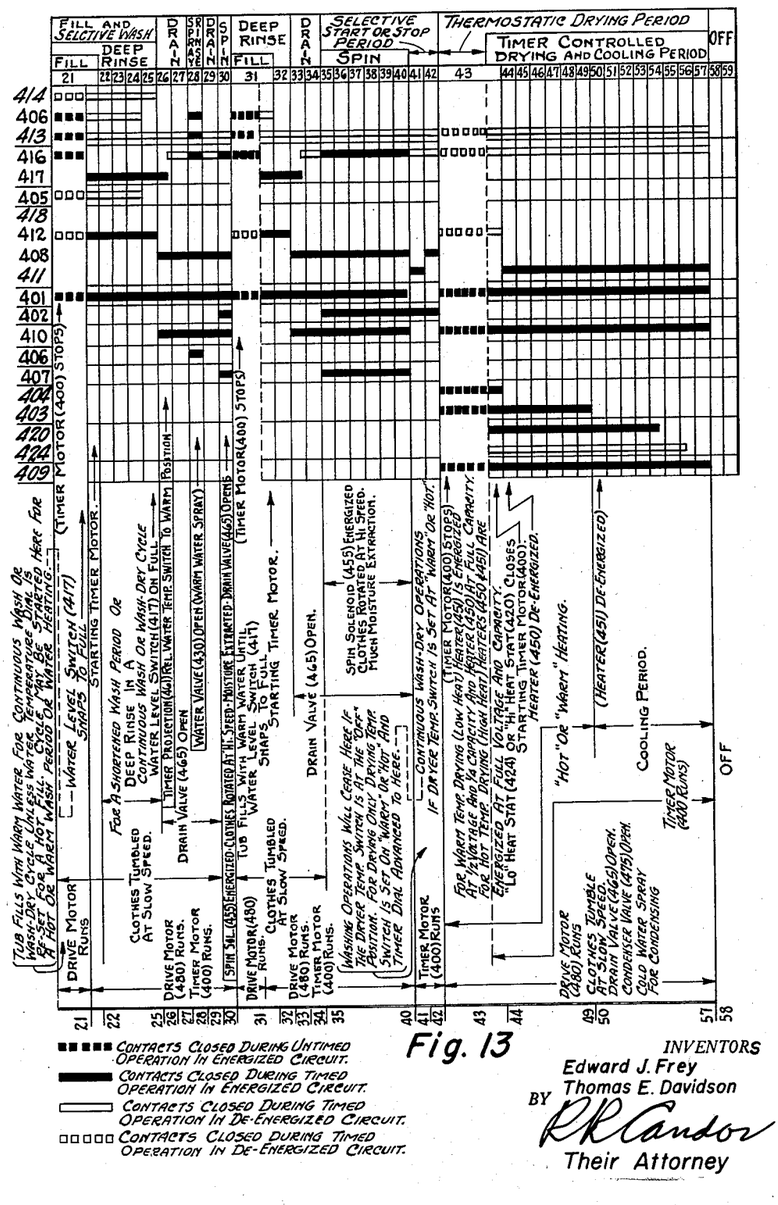
Figure 13 is a continuation of the chart of Figure 12 applying to positions 21 through 59 of the timer knob.
Figure 14:
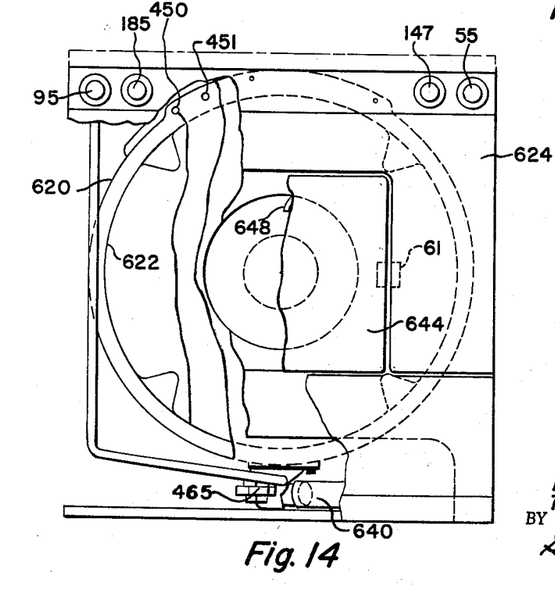
Figure 14 is a front view partly diagrammatic, partly broken away, showing a washer-dryer embodying our invention.
Figure 15:
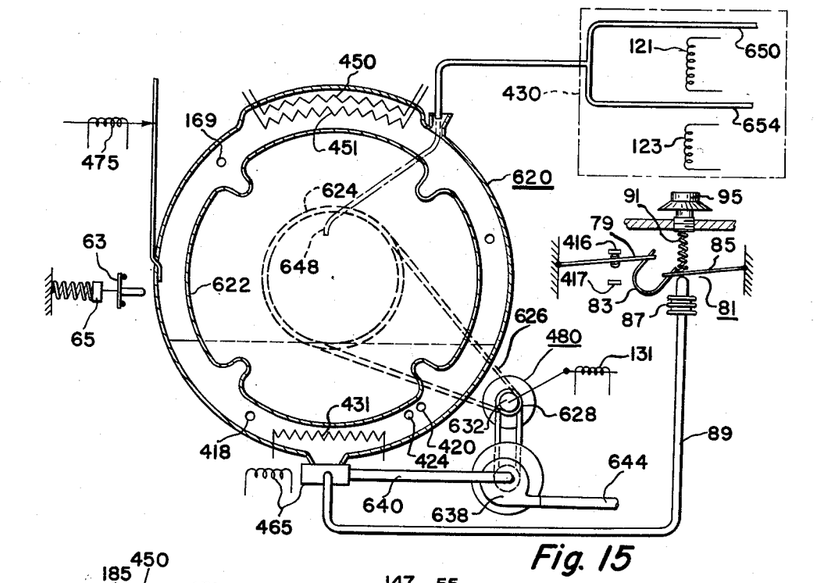
Figure 15 is a vertical diagrammatic sectional view of a washer-dryer embodying our invention.

Referring now to the drawings and more particularly to Figure 1, the improved control includes a periodically actuating timer motor 400 which periodically advances a cam shaft 21. This cam shaft 21 is provided with the following cams:

A cam 23 operating the switch 25 which controls the timer motor 400;

A cam 27 operating the drain valve switch 29;

A cam 31 operating a double throw switch 33 controlling the condenser valve and timer motor 400;

A cam 35 controlling a double throw switch 37 which controls the water valve 430 and the spin solenoid 131;

A cam 39 controlling the releasing of the water temperature control latch;

A cam 41 which operates the double throw switch 43 alternately controlling one of the drying heaters and the water heater;

A cam 45 controlling the double throw switch 47 alternately controlling another dryer heater and the motor switch bypass; and, A cam 49 controlling a switch 51 controlling the drive motor 480. These cams all have contours shaped to provide the positioning of the respective switches as indicated in Figures 12 and 13. The front portion of the cam shaft 21 is slidably but non-rotatably connected to the knob shaft 53 provided with a timer dial knob 55 having positions 0 to 59 corresponding to the positions to which the cam shaft 21 is advanced by the timer motor 400. With the exception of interruptions for tub filling, water heating, and dryer heating, the advances from one position to another take place each 45 seconds. The axial movement of the timer dial 55 and the shaft 53 is used to manually open and close the switch 57 connected by the conductor 59 to the supply conductor $L_1$.

The switch 57 connects directly to a switch 61 which is opened whenever the washing machine cabinet door 644 is opened. Such a door 644 may correspond to the door 58 in the aforesaid Chamberlain reissue patent. The switch 61 connects directly to the unbalanced load switch 63 which opens in response to excessive unbalancing or excess amplitude of vibrations of the machine. This switch 63 is preferably provided with a time delay device 65 to delay its reclosing. The switch 63 connects to a conductor 67. The conductor 67 connects through an overload protector switch 69, the contacts 401 and the switch 51 to the split phase drive motor 480. This drive motor 480 is connected by the conductor 71 to the neutral supply conductor N. The drive motor includes a main winding and a phase winding controlled by a centrifugal switch 73 which opens the phase winding circuit at a suitable tripping speed. Above this tripping speed, this centrifugal switch 73 closes an additional set of contacts to connect the conductor 67 with a conductor 75. This centrifugal switch may be arranged like that shown in Figure 5 of the Livingston Patent No. 1,811,090, issued June 23, 1931. The drive motor 480 may be otherwise similar to the drive motor 56 of the aforesaid Chamberlain et al. Reissue Patent No. 22,375.

The conductor 75 is connected by the conductor 77 to the double throw contact member 79 of the snap acting water level switch 81. The double throw contact member 79 is connected to a C-shaped toggle spring 83 which in turn is connected to a lever 85 operated by a bellows or flexible diaphragm 87. This bellows or flexible diaphragm 87 is connected by a tube 89 beneath the water level in the casing 620 of the machine 624 which corresponds to the casing 34 of the aforesaid Chamberlain patent. This tube 89 and bellows 87 contain air which is compressed slightly when the liquid level rises in the casing. The lever 85 is held in contact with the bellows 87 by a spring 91 which is adjusted by the axial movement of a threaded shaft 93. This threaded shaft 93 is adjusted by a dial knob 95 which may be turned to low, medium or full positions or any desired position in between in order to select the maximum level of filling of liquid in the casing.

Figure 4:
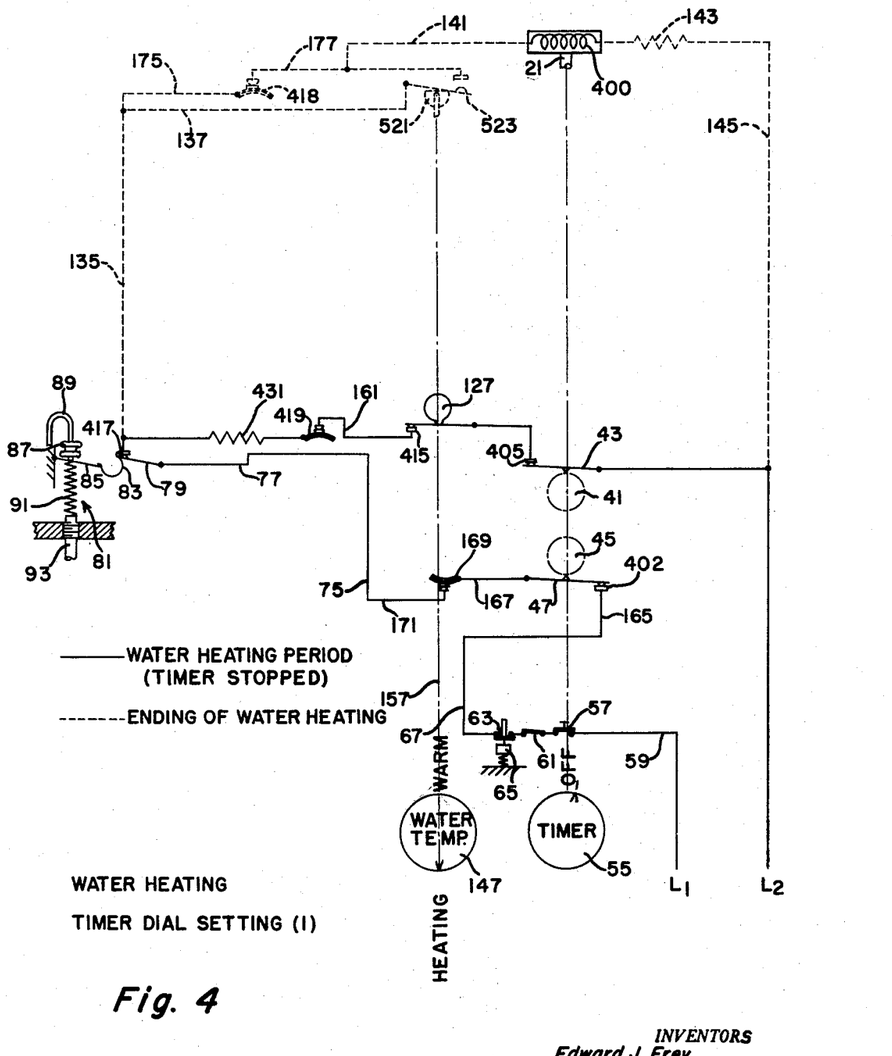
Figure 4 is a diagrammatic view and wire diagram illustrating the circuits and the parts pertaining to the water heating.

When the liquid level is below the selected level, the spring 91 will hold the lever 85 and the toggle spring 83 and the double throw switch 79 in the position shown in Figure 1. However, when the liquid level rises to the level selected by the position of the knob 95 and the shaft 93, the rise in pressure in the tube 89 and the bellows 87 due to the rise in liquid will cause the bellows to expand and to move the lever 85 and the toggle spring 83 downward to cause the double throw switch 79 to move out of contact with the lower contact 416 and into contact with the upper contact 417 as shown in Figure 4. The lower contact 416 is connected by the conductor 97 to the hot water solenoid coil 121 and the cold or tepid water solenoid coil 123 of the water valve 430. These solenoids correspond to the solenoids 68A and 68B of Chamberlain et al. (Re. 22,375). The solenoid 121 is connected to the contact 414. The solenoid 123 is connected to the contact 413. A double throw switch 125 positioned by the water temperature cam 127 is adapted to alternately contact these contacts 413 and 414. The double throw contact member 125 is connected by the conductor 129 to a contact 406. The conductor 97 is also connected through the spin solenoid 131 to the contact 407. The spin solenoid 131 is used to effect a change in drive ratio in the transmission 632 between the motor 480 and the rotatable container 622 corresponding for example to the container 38 of Chamberlain et al. The energization of the solenoid shifts the transmission so as to change the rotation of the container from low speed to high speed thereof. The transmission corresponds to the transmission 54 and spin solenoid 131 corresponds to the solenoid 160 of Chamberlain et al. (Re. 22,375). The double throw switch member 37 is positioned by the cam 35 to contact the contact 406 during water fill periods and to contact the contact 407 during spin or centrifuging periods.

The contact 417 is connected through a conductor 135 and a conductor 137 to a contact 412. The chart (Figures 12 and 13) shows that in certain positions of the dial knob 55, the switch 25 engages the contact 412. The contact 25 is connected by the conductor 139 and the conductors 141 to the timer motor 400. The timer motor 400 is connected through the resistance 143 and the conductor 145 to the supply conductor $L_2$. When water filling is completed, the water level switch 81 moves from the empty position to the full position and moves the contact 79 out of contact with the contact 416 to deenergize the solenoids 121 or 123 and into contact with the contact 417 to energize the timer motor through the contact 412 and the switch member 25. The timer motor is preferably of the type which when energized jumps from one position to the next position at predetermined intervals such as 45 seconds. A timer motor of this type is disclosed in the Hall Patent No. 2,227,133, patent issued December 31, 1940.

To start a complete cycle, the water level control knob 95 is set to either low, medium or full positions depending upon the quantity of clothes put into the machine. The dryer temperature knob 185 is set to high or low if drying is desired or to off if no drying is desired. The water temperature dial 147 is set to water heat if heating is required and timer dial knob 55 is moved to position 0. In position 0 the cam 49 moves the switch member 51 to closed position and the cam 23 moves the switch member 25 to the open position as shown under the first part of position 0 on the chart Figure 12. This prevents the operation of the timer motor 400 until the water level switch 81 moves to closed position energizing this timer motor 400 for 45 seconds only as in the latter part of position 0 providing an advance to position 1 only. This stops the entire machine unless the water temperature dial and knob 147 is turned to the water heat position.

Figures 2, 3:
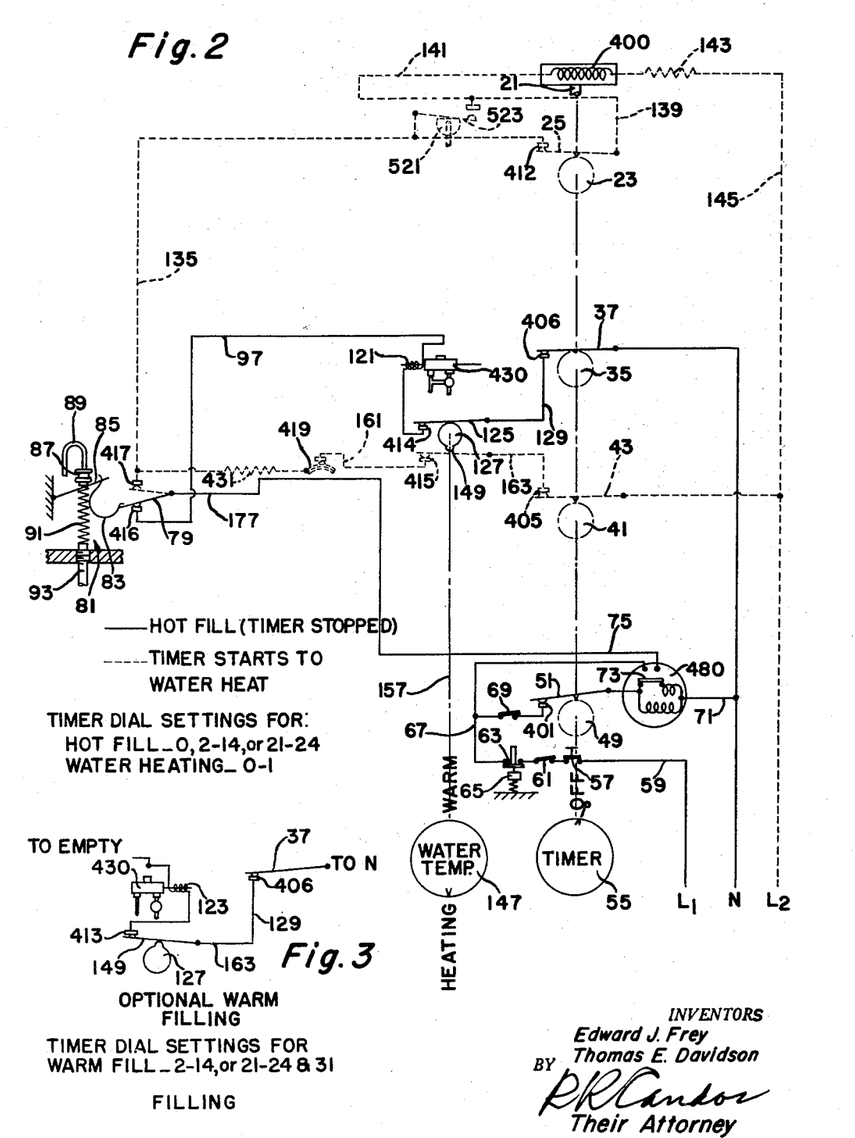
Figure 2 is a diagrammatic view and wiring diagram illustrating the circuits and the elements energized and deenergized during the filling (with a hot fill) and water heating periods.
Figure 3 is a fragmentary diagrammatic view illustrating the change in setting for an initial warm fill.

As shown in Figure 2, if the water temperature dial knob 147 is turned to the water heat position, the cam 127 will be turned 180° to move the switch member 149 into contact with the contact 415. The switch member 125 will also move into contact with the contact 414 to connect to the hot water coil 121 providing hot water from the hot water supply 650 if available. The water temperature dial and knob 147 is held in either the water heat position or the hot position by the notched cam 151 which is engaged by a latch lever 153 pulled into engagement with the cam 151 by a tension spring 155. The cams 127 and 151 are connected to the dial knob 147 by a shaft 157. A torsion spring 159 is wrapped around the shaft 157 and has one end connected to it so that it tends to turn the shaft 157, the cams 151 and 127 and the knob 147 in the counterclockwise direction to the warm position. To set the dial knob 147, it is turned clockwise to the hot or water heating positions while the timer knob 55 is in positions 0, 1 or 21.

When the knob 55 is in position 1, as shown in Figure 4, the cam 41 holds the switch member 43 in contact with the contact 405. Current flows from the contact 417 through the water heater 431, the water temperature safety thermostat 419 and the conductor 161 to the stationary contact 415. The current flow continues through the switch member 149, the conductor 163, the contact 405 and the switch member 43 to the supply conductor $L_2$. The water temperature safety thermostat 419 is merely provided to prevent overheating the water and normally remains closed at all times. The water heater 431 is in heat exchange relation with the water in the casing. It corresponds to the water heater 79 of Chamberlain et al. (Re. 22,375). During this time, as illustrated in Figure 4, the timer motor 400 and the drive motor 480 are deenergized. In position 1, the cam 45 positions the switch member 47 in contact with the contact 402. The centrifugal switch 73 of the drive motor 480 is bypassed or shunted by a conductor 165 connecting to the contact 402. The switch member 47 is connected by the conductor 167 to the dryer safety thermostat 169 which is located within the casing and is normally closed excepting when the casing reaches an abnormally high temperature. The dryer safety thermostat 169 is connected by the conductor 171 to the conductor 75 which connects through the conductor 77, the switch member 79, and the contact 417 to the water heater 431. The water heater 431 heats the water in the casing until the water reaches the temperature at which the water heater thermostat 418 closes. This water heater thermostat is located in direct heat exchange relation with the water in the casing of the laundry machine.

The closing of the water heater thermostat 418 connects the conductor 135 and the conductor 175 with the conductors 177 and 141 connecting with the timer motor 400 as illustrated in dash lines in Figure 4. This energizes the timer motor and causes it to make the shaft 53 and the timer dial 55 to jump after an interval of 45 seconds to position 2. This terminates the untimed water heating period preceding the normal wash period.

Figure 5:
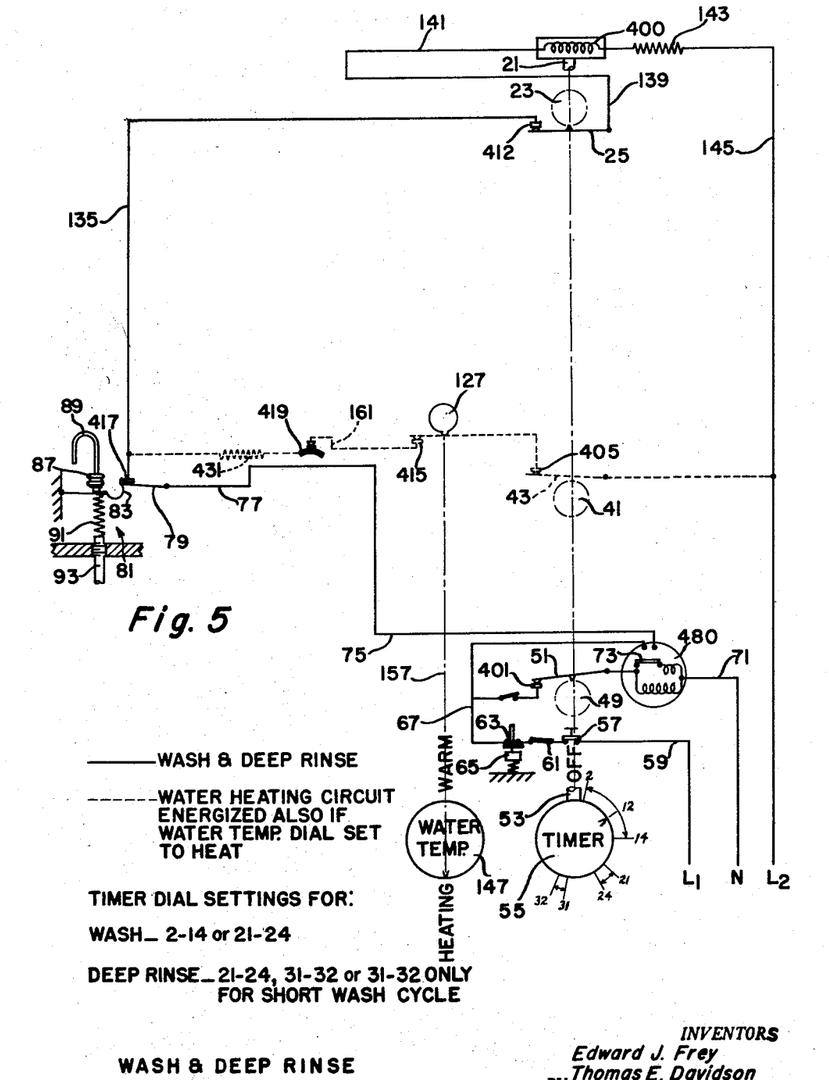
Figure 5 is a diagrammatic view and wire diagram illustrating the circuits and the parts pertaining to the wash and rinse periods.

If the water temperature 147 is set to hot or warm, an additional energizing circuit portion must be provided to take the place of the water heater thermostat 418 for operating the timer motor 400 and the cams and the timer dial 55 operated thereby from position 1 to position 2. For this purpose, the water temperature dial knob 147 and the shaft connected thereto are provided with a semicircular cam 521. This cam 521 is oriented relative to the dial 147 to have the round portion holding a switch 523 in the closed position in the warm and hot positions of the dial 147. This switch 523 provides a connection between the conductors 137 and 139 in parallel with the switch contacts 411—412 and the water heater thermostat 418. Since the water heater thermostat remains open when there is no water heating and since the contacts 411—412 are open in position 1, the switch 523 is the only connection for energizing the timer motor to operate the timer dial-knob 55 and the timer cams from position 1 to position 2 when no water heating is desired. By this, the washing cycle continues automatically from positions 0 and 1 regardless of the position of the water temperature dial. However, if it is desired to stop the machine after a warm or hot fill in position 0, it is merely necessary to omit the cam 521 and the switch 523. As shown by the chart (Fig. 12) the cam 23 returns the switch member 25 into contact with the contact 412 in position 2. The cam 49 returns the switch member 51 into contact with the contact 401. The switch member 47 is moved to the open circuit position. The switch member 43 remains in contact with the contact 405 to continue water heating during the wash period including positions 2 to 14. Normally this heat will not be sufficient to materially raise the temperature of the water or to cause the water temperature safety thermostat 419 to open. The water temperature safety thermostat 419 will open to prevent excessive high water temperature at any time. The operation of the drive motor 480 will agitate the clothes within the washing container 622 by slow speed rotation through pulleys 628, 624 and belt 626 to provide a washing action to wash the clothes. The energizing circuits are clearly shown in Figure 5.

As the timer dial and knob move from position 14 to position 15 the cam 41 moves the switch member 43 to the neutral or disconnecting position thereby deenergizing the water heater 431. The cam 35 also moves the switch member 37 to the neutral or disconnecting position at this time.

Figure 6:
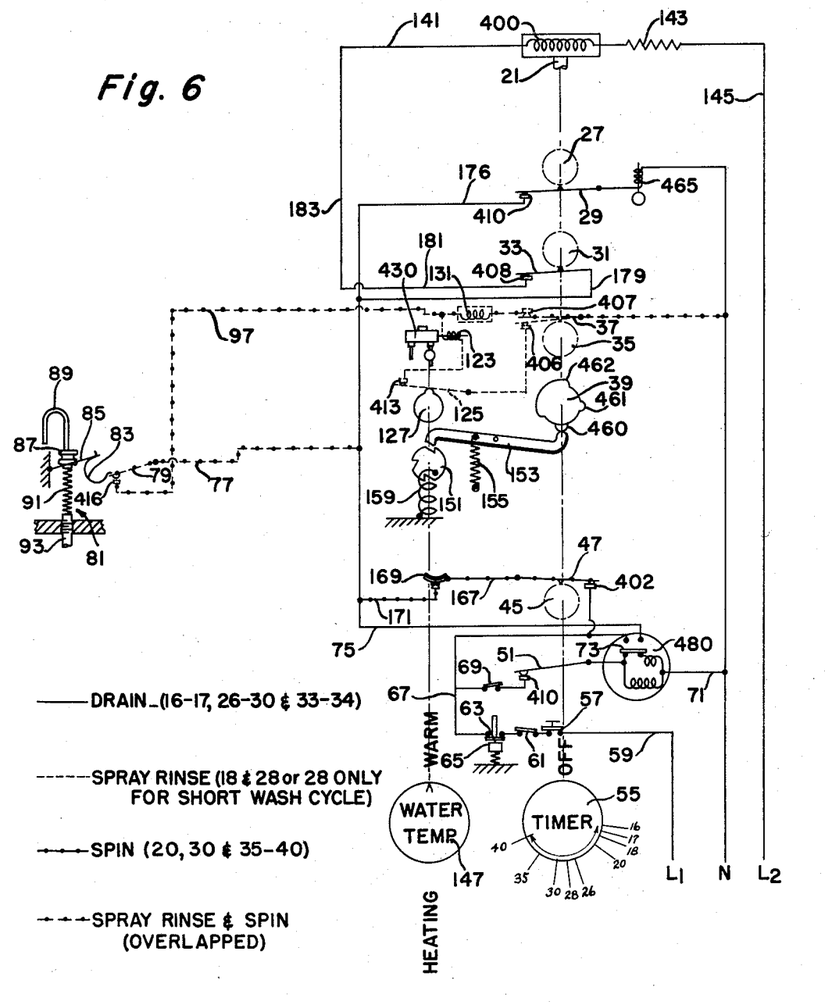
Figure 6 is a diagrammatic view and wiring diagram illustrating the circuits and the parts pertaining to the drain, spray rinse and spin periods.

When the timer motor moves from position 15 to position 16 the cam 23 moves the switch member 25 to the neutral or disconnecting position as indicated in Figure 12. At the same time the cam 27 moves the switch member 29 to the closed position into contact with the contact 410 as indicated in Figure 6. This connects the conductor 75 through the conductor 176, the contact 410, the switch member 29 to the drain valve and solenoid 465 which in turn connects to the supply conductor N. The drain valve and solenoid 465 is thus opened which permits the liquid to drain from the casing and be pumped by pump 638 through the hose connections 640, 644 to a suitable drain. The pump 638 is driven by the motor 480. This drain valve is analogous to the drain valve 96 and its solenoid 98 in the Chamberlain et al., Re. 22,375 patent. The cam 31 also moves the switch member 33 into contact with the contact 408 as shown in Figure 6. This closes a circuit from the conductor 75 through the conductor 179, the switch 33, the contact 408, the conductor 181 and the conductor 183 which connects with the conductor 141 and the timer motor 400 to continue the operation of the timer motor. The switch member 51 remains in closed position to continue the operation of the drive motor. During the time the timer dial remains in position 16, the opening of the drain valve 465 causes the water level to fall and to move the water lever switch member 79 out of contact with the upper contact 417 and into contact with the lower contact 416. However, since the switch member 37 is in the neutral or open circuit position this does not affect the operation at this particular time. At the same time the projection 460 on the cam 39 engages the latch lever 153 and turns it clockwise as shown in Figure 6 to release the cam 151 for movement from either the water heat or the hot water position to the warm position under the force of the coil spring 159. This moves the switch member 149 to the open circuit position to prevent further water heating unless the water temperature dial is reset to either the water heat or hot positions. This also moves the switch member 125 into contact with the contact 413.

No change takes place when the timer dial and knob 55 moves from position 16 to position 17. However, when this dial knob is moved from position 17 to position 18, the cam 35 moves the switch member 37 into contact with the contact 406. This energizes the solenoid 123 through the dash line circuit in Figure 6 for the period of 45 seconds in which the timer dial knob 55 remains in position 18 to provide a spray rinse from the warm water supply 654. For this purpose, the outlet 648 of the valve 430 extends to the inside of the clothes washing container so that the liquid is sprayed directly onto the clothes therein while the drain valve 465 is open in a manner similar to that shown in the Renner et al. Patent 1,457,750, issued June 5, 1923. After this 45 second spray rinse, the timer motor moves the timer motor and dial 55 from position 18 to position 19. After 45 seconds the timer dial and knob 55 is moved to position 20. At the same time, the cam 35 moves the switch member 37 into contact with the contact 407 to energize the spin solenoid 131 through the upper dot-dash circuit indicated in Figure 6. The cam 45 also moves the switch member 47 into contact with the contact 402 to bypass or shunt the centrifugal switch 73 so that any momentary slowing down of the drive motor 480 at the start of the spin period will not cause deenergization of the spin solenoid 131 as indicated by the lower dot-dash circuit in Figure 6. The clothes container 622 is rotated by the motor 480 through the transmission 632 at spinning speed in position 20 to extract the liquid from the clothes while the drain valve 465 remains open. After spinning for 45 seconds, the timer motor jumps the timer knob and dial 55 to position 21.

If desired, the cycle may be started in position 21 and hot water may be obtained by turning the water temperature dial to either the hot or water heat positions. Switch member 43 will be in contact with contact 405 through positions 21, 22, 23, 24 but the water heater 431 will not be energized unless the water temperature dial 147 is reset to water heat, reclosing contacts 149—415. As shown by the chart (Fig. 13) the rinse cycle extending from positions 21 to 30 inclusive is similar to the initial wash cycle with the exception that position 1 is omitted and the number of positions is reduced by reducing the length of the agitating period. The second rinse period extending from positions 31 to 40 inclusive is similar to the first rinse period with the exception of the omission of the spray rinse and drain periods corresponding to positions 28 and 29 and the spin period is lengthened to extend from positions 35 to 40 inclusive.

Figure 7:
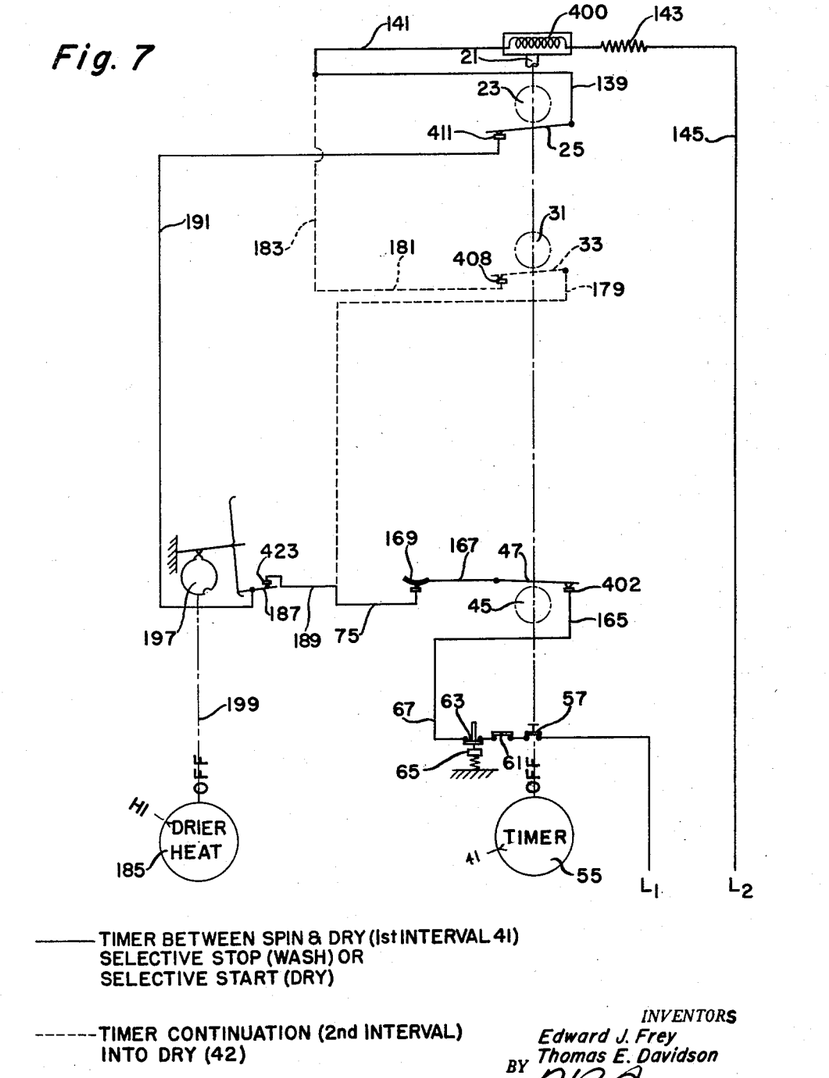
Figure 7 is a diagrammatic view and wiring diagram showing the circuits and the parts pertaining to the stopping or continuation of the operation from the final centrifuging period into the drying cycle.
Figures 8, 9:
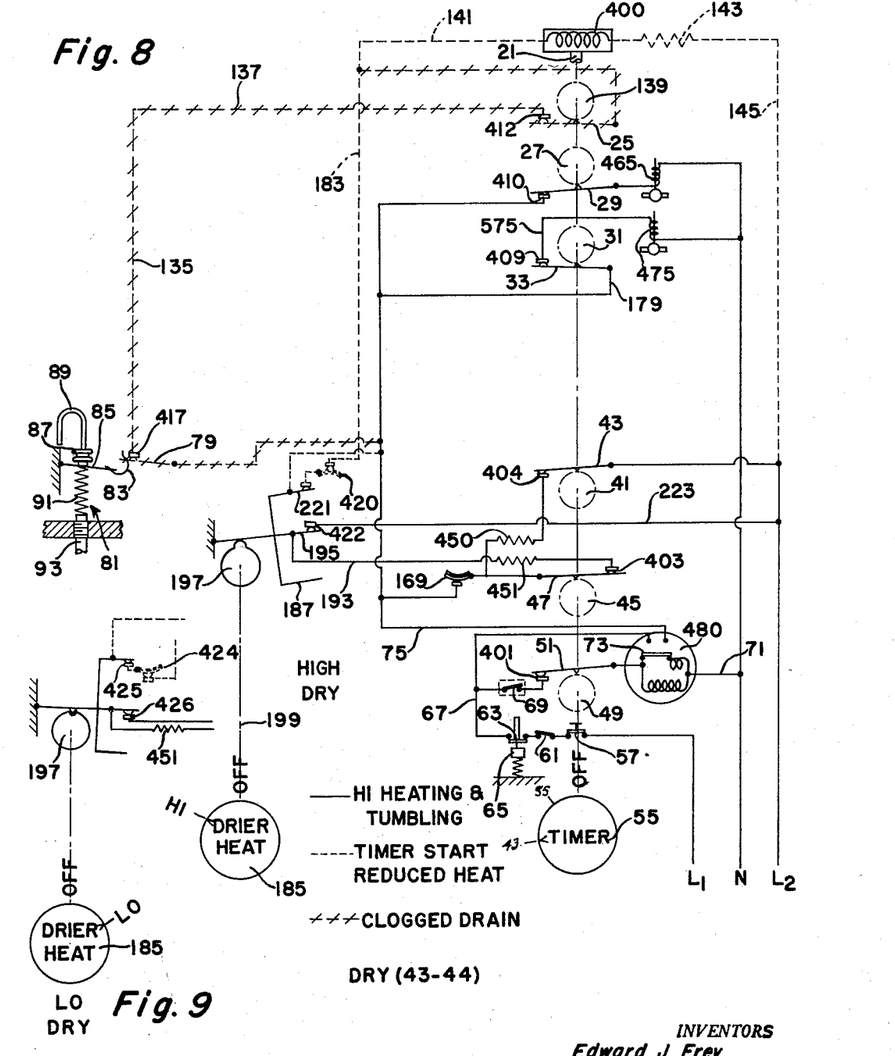
Figure 8 is a diagrammatic view and wiring diagram illustrating the parts and circuits pertaining to the drying period with the dryer temperature selector in the high heat position.
Figure 9 is a fragmentary diagrammatic view and wiring diagram illustrating the changed position of the controls for low temperature drying.

If the dryer temperature selector dial and knob 185 remains in the off position, all operations will cease when the timer motor 400 causes the timer dial 55 to jump from position 40 to position 41. At this time the cam 31 moves the switch member 33 to the neutral or open circuit position to deenergize the timer motor. As shown by the chart (Fig. 13) all of the cam operated switches will be in the open circuit positions excepting the switch member 47 is in contact with contact 402 and switch member 25 which is moved to contact the switch member 411. Since the conductor 191 is disconnected when the dryer temperature dial 185 is in the off position, this will stop all operations. The switch member 79 will also be in engagement with the switch contact 416. However, as shown in Figure 7, it is necessary that the dryer temperature selector dial and knob 185 be moved to either the high or low positions to connect the switch member 187 with either the contact 423 or the contact 427 to complete the circuit to the timer motor 400 as shown in full lines in Figure 7. In Figure 8, the circuits are shown with the dial and knob 185 in the high temperature setting. This completes the circuit from the conductor 75 through the branch conductor 189, the contacts 423 or 427 and the conductor 191 to the contact 411 from which the current flows through the switch member 25, the conductors 139 and 141 to the timer motor 400. This causes the timer motor to continue operation and to jump to position 42 in which the switch member 33 is moved into contact with the contact 408 while the switch member 25 is moved away from the contact 411. This completes the dash line shunt from the conductor 75 through the switch member 33 and contact 408 and the conductors 181, and 141 and 183 to continue the operation of the timer motor 400 for another 45 seconds. The timer motor then jumps the cam shaft 21 and the timer dial 55 from position 42 to position 43.

This moves the switch member 33 to the open circuit position thereby deenergizing the timer motor 400 to stop its operation for an untimed period. As shown in Figure 8, the movement to position 43 has caused the cam 49 to move the switch member 51 into contact with the contact 401 to operate the drive motor 480. The cam 45 has also moved the switch member 47 into contact with the contact 403 connecting with the dryer heater 451. This dryer heater 451 is connected by the conductor 193 with the middle contact member 195 of the dryer temperature selector switch. This switch is operated by the cam 197 connected by a shaft 199 to the dial 185. This switch also includes a third contact 221. The switch member 195 is adapted to make contact with either of the stationary contacts 422 or 426, but in Figure 8 is shown in contact with contact 422. The contact 422 is connected by the conductor 223 to the live supply conductor $L_2$ to apply the maximum voltage of 236 volts to the heater 451. The low temperature contact 426 is connected by the conductor 225 to neutral conductor N to apply a voltage of 118 volts to the dryer heater 451. At the same time the cam 41 moves the switch member 43 into contact with the stationary contact 404 to connect the dryer heater 450 to the live supply conductor $L_2$ to apply a voltage of 236 volts thereto. Thus, as long as the timer dial remains in position 43 with the dryer temperature dial in either of its high or low positions, both heaters 450 and 451 will be energized.

The switch member 33 is also in contact with the stationary contact 409 to energize the condenser valve solenoid 475 through conductors 75, 179, switch 33, contact 409, conductor 575, and the valve solenoid 475 to the neutral supply conductor N to provide from the cold water pipe 666 a flow of cool condensing water within the casing to condense moisture out of circulating air. This may be a part of any suitable condensing arrangement such as shown in Pugh Patent 2,451,692, issued October 19, 1948, or the Hammell Patent 2,644,245, issued July 7, 1953, for example. At the same time, the switch member 29 engages the contact 410 to energize the drain valve 465 to keep it open so that the condensing water may be continuously drained. The condensing water also collects and carries with it airborne lint which may be disengaged from the clothes during the drying period. The drivemotor 480 is also energized to fluff the clothes and to untangle the clothes during drying.

The switch member 25 also moves into engagement with the contact 412. This circuit, indicated by crossed dashes on Figure 8, is normally inoperative and ineffective. However, should there be a failure of the drain to remove the condensing water, the level of the condensing liquid will rise in the casing until the water level switch 81 moves to the full position engaging the switch members 79 and 417. This will start the timer motor 400 immediately through the circuit indicated by the cross dashes and the dotted line 141 on Figure 8 to terminate the untimed drying period through the usual moderating and cooling period.

Figures 10, 11:
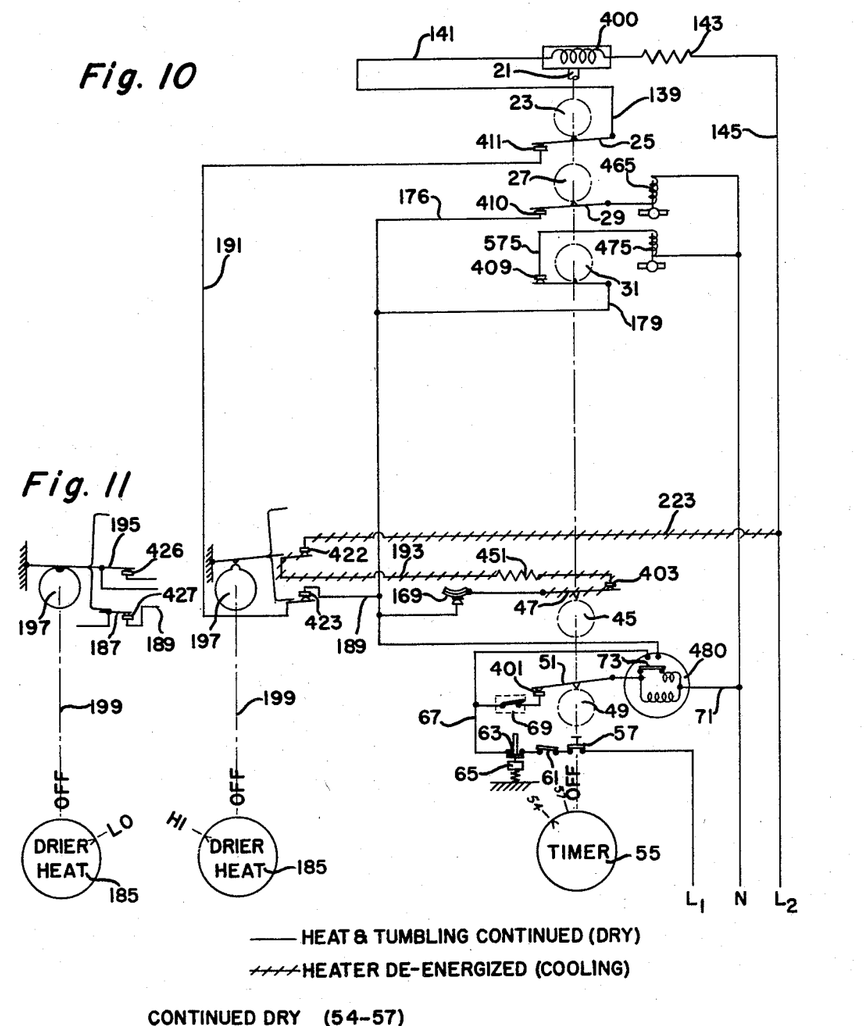
Figure 10 is a diagrammatic view and wiring diagram showing the parts and circuits pertaining to the termination of the heating with the dryer temperature dial in the higher position.
Figure 11 is a fragmentary diagrammatic view and wiring diagram showing the change in position for low temperature drying.

If the dryer temperature dial is set to the low setting, as indicated in Figure 9, the closing of the low temperature dryer thermostat 424 will energize the timer motor 400 through the conductor 227, contacts 221 and 425, thermostat 424, and conductors 183 and 141. After 45 seconds of energization the timer motor will cause the cams and timer dial to jump to position 44. As shown by the chart in Figure 13, this will move the switch member 25 out of engagement with the contact 412 and into engagement with the contact 411. The timer motor 400 will then be continuously energized through the conductor 75 and 189, the contact 427, the switch member 187, the conductor 191, the contact 411 and switch member 25, the conductors 139 and 141 as shown in full lines in Figure 10. Also as shown by the chart, the heater 450 is deenergized by the switch member 43 being moved away from the contact 404 by the cam 41. Heating therefore continues by the dryer heater 451 alone from position 49 in an amount sufficient to maintain the temperature within the casing for low temperature drying. This heating, however, is insufficient to cause the temperature to rise. When the timer dial and knob 55 as well as the cams jump from the position 49 to the position 50, the switch member 47 is moved away from the contact 403 to deenergize the dryer heater 451 to stop all heating. The clothes then begin to cool but the water condensing and the draining and the operation of the drive motor 480 continues until the timer dial moves to the position 58 which is the stop or off positon. The clothes then are sufficiently cooled and ready to be removed.

The drying period is substantially the same in either the high or low position with the exception that the closing of the switch 420 takes place at a higher temperature in the high position and therefore starts the timer motor 400 at a later time than when in the low position. Also the dryer heater 451 operates at the maximum voltage, since the switch member 195 is in engagement with the contact 422 connecting with the line L₂ when the dial 185 is set too high. This arrangement makes possible rapid drying with the necessary protection to fabrics which may be damaged by the high heat. In this way I have provided an improved very flexible and adaptable control system for the combined washer-dryer. If desired, a continuously operating timer motor may be substituted for the periodically actuating timer motor without any substantial changes in the system.

In accordance with the provisions of Rule 78a, reference is made to the following prior filed application: S.N. 501,060, filed April 13, 1955, now abandoned.

While the form of embodiment of the invention as herein disclosed constitutes a preferred form, it is to be understood that other forms might be adopted, as may come within the scope of the claims which follow.

What is claimed is as follows.

1. A washing machine including a container, a two temperature liquid filling means for supplying liquid at two different temperatures to said container, means for agitating the contents of said container, means for spinning said tub to centrifuge the liquid contents therefrom, timing means for controlling said filling means and said agitating means and said spinning means, said filling means including a two position two temperature selector and latch means for holding said selector in a first position for filling at a first temperature and biasing means for resiliently urging and moving said selector to a second position for filling at a second temperature, said timing means having means for releasing said latch means for movement from said second position to said first position following the operation of said agitating means.

2. A washing machine including a container, a two temperature liquid filling means for supplying liquid at two different temperatures to said container, means for agitating the contents of said container, means for spinning said tub to centrifuge the liquid contents therefrom, timing means for controlling said filling means and said agitating means and said spinning means, said filling means including a two position two temperature selector and latch means for holding said selector in a first position for filling at a first temperature and biasing means for resiliently urging and moving said selector to a second position for filling at a second temperature, said timing means including means successively controlling said filling agitating and spinning means in two sequences to provide normal wash and rinse cycles and having control means for starting operation at the beginning of either of two filling periods, said timing means also having means for releasing said latch means for movement from said second position to said first position following the wash agitating period and the rinse agitating period.

3. A washing machine including a container, a two temperature liquid filling means for supplying liquid at two different temperatures to said container, heating means for heating the liquid in the container, means for agitating the contents of the container, means for spinning the container to centrifuge the contents therefrom, a three position selector having latch means for holding said selector in two of the positions and having biasing means for biasing from said two positions to a third position, said selector having means effective in one of said two positions for operating said heating means, said selector having means effective in the other of said two positions and the third position for operating said filling means to fill selectively at first and second different temperatures, timing means for controlling said filling means and said heating means and said agitating means and said latch means and said spinning means.

4. A washing machine including a container, a two temperature liquid filling means for supplying liquid at two different temperatures to said container, heating means for heating the liquid in the container, means for agitating the contents of the container, means for spinning the container to centrifuge the contents therefrom, a three position selector having latch means for holding said selector in two of the positions and having biasing means for biasing from said two positions to a third position, said selector having means effective in one of said two positions for operating said heating means, said selector having means effective in the other of said two positions and the third position for operating said filling means to fill selectively at first and second different temperatures; timing means for controlling said filling means and said heating means and said agitating means and said latch means and said spinning means successively in a first sequence and said filling, agitating, latch and spinning means in a second sequence.

5. A dryer including a container, means for rotating the container, heating means associated with the container, timing means for controlling the heating means and the rotating means, a high temperature thermostatic means responsive to a predetermined high temperature of said container, a lower temperature thermostatic means responsive to a predetermined lower temperature of said container, and selective means for selectively connecting either of said high and lower temperature thermostatic means to start said timing means selectively at said high and lower temperatures of said container, said selective means also including means for energizing said heating means at a high rate when the high temperature means is connected and for energizing said heating means at a lower rate when the lower temperature means is connected.

6. A washing machine including a container, liquid filling means for said container, agitating means for agitating the contents of the container, heating means for said liquid, timing means for controlling said filling means and agitating means and starting said heating means and stopping said agitating means, thermostatic means responsive to the temperature of the liquid in said tub for terminating the operation of said heating means and starting the operation of said agitating means, a temperature control for said liquid filling means having a hot and a warm position, a temperature control dial and manual manipulator operatively connected to said heating means and temperature control and having one position rendering effective said heating means and said thermostatic means and a second position placing said temperature control in said hot position and a third position placing said temperature control in said warm position, means for biasing said dial and manipulator from said one position to said second and third positions, latch means for holding said dial and manipulator in said one and second positions, said timing means having means for releasing said latch means at predetermined times during its operation.

7. A laundry dryer including a container, means for rotating the container, heating means for said container, timing means for terminating the operation of the heating means, high and lower temperature thermostatic means responsive to predetermined high and lower temperatures of said container, selective control for said heating and thermostatic means having one alternative position for operating said heating means at a high rate and for connecting said timing means under control of said high temperature thermostat to start in response to a predetermined high temperature in said container and having a second alternative position for operating said heating means at a lower rate and for connecting said timing means under control of said lower temperature thermostat to start in response to a predetermined lower temperature in said container.

References Cited in the file of this patent

UNITED STATES PATENTS

| | | |
|---|---|---|
| 2,168,068 | Lowecke | Aug. 1, 1939 |
| 2,356,816 | Breckenridge | Aug. 29, 1944 |
| 2,377,551 | Harvey | June 5, 1945 |
| 2,391,718 | Lindemann | Dec. 25, 1945 |
| 2,417,998 | Wales | Mar. 25, 1947 |
| 2,607,209 | Constantine | Aug. 19, 1952 |
| 2,654,961 | Manecke | Oct. 13, 1953 |
| 2,656,695 | Miller | Oct. 27, 1953 |
| 2,693,097 | Chatelain | Nov. 2, 1954 |
| 2,744,337 | Raney | May 8, 1956 |
| 2,768,518 | Douglas | Oct. 30, 1956 |
| 2,778,212 | Dayton et al. | Jan. 22, 1957 |
| 2,785,557 | Stilwell | Mar. 19, 1957 |
| 2,796,679 | Dunkelman | June 25, 1957 |